(12) United States Patent
Ancimer

(10) Patent No.: US 9,617,883 B2
(45) Date of Patent: Apr. 11, 2017

(54) MULTI-LEG AFTERTREATMENT SYSTEM

(71) Applicant: Cummins Inc., Columbus, IN (US)

(72) Inventor: Richard J. Ancimer, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/019,604

(22) Filed: Feb. 9, 2016

(65) Prior Publication Data
US 2016/0160719 A1 Jun. 9, 2016

Related U.S. Application Data

(63) Continuation of application No. 14/058,688, filed on Oct. 21, 2013, now Pat. No. 9,273,577.

(60) Provisional application No. 61/720,379, filed on Oct. 30, 2012.

(51) Int. Cl.
| F01N 3/10 | (2006.01) |
| F01N 3/023 | (2006.01) |
| F01N 3/035 | (2006.01) |
| F01N 3/20 | (2006.01) |
| F01N 3/031 | (2006.01) |
| F01N 13/00 | (2010.01) |

(52) U.S. Cl.
CPC ............ *F01N 3/023* (2013.01); *F01N 3/031* (2013.01); *F01N 3/035* (2013.01); *F01N 3/208* (2013.01); *F01N 3/2053* (2013.01); *F01N 3/2066* (2013.01); *F01N 13/0097* (2014.06); *F01N 13/011* (2014.06); *F01N 2560/026* (2013.01); *F01N 2610/146* (2013.01); *F01N 2900/08* (2013.01); *F01N 2900/1402* (2013.01); *F01N 2900/1406* (2013.01); *F01N 2900/1411* (2013.01); *F01N 2900/1606* (2013.01); *Y02T 10/24* (2013.01)

(58) Field of Classification Search
CPC ........ F01N 3/2053; F01N 3/035; F01N 3/031; F01N 13/0097
USPC ......................................................... 60/301
See application file for complete search history.

(56) References Cited

U.S. PATENT DOCUMENTS

| 6,269,633 B1 | 8/2001 | van Nieuwstadt et al. |
| 6,820,417 B2 | 11/2004 | May et al. |
| 7,213,395 B2 | 5/2007 | Hu et al. |
| 7,251,932 B2 | 8/2007 | Huang |
| 7,263,824 B2 | 9/2007 | Bellinger et al. |
| 7,334,400 B2 | 2/2008 | Yan et al. |
| 7,343,736 B2 | 3/2008 | Kalish |

(Continued)

*Primary Examiner* — Jason Shanske
(74) *Attorney, Agent, or Firm* — Taft Stettinius & Hollister LLP

(57) ABSTRACT

An apparatus is disclosed, including an exhaust conditions module structured to interpret a diesel particulate filter (DPF) delta pressure value, a flow balance correlation, a $NO_x$ input value, and an exhaust flow rate value. A flow determination module is structured to determine a flow imbalance value in response to the DPF delta pressure value, the flow balance correlation, and the exhaust flow rate value. A reductant determination module is structured to determine a first reductant injection command and a second reductant injection command in response to the flow imbalance value and the $NO_x$ input value.

12 Claims, 5 Drawing Sheets

(56) References Cited

U.S. PATENT DOCUMENTS

2006/0010859 A1\* 1/2006 Yan ..................... F01N 13/011
                                                          60/286
2010/0043399 A1\* 2/2010 Stroia .................. F01N 3/0253
                                                          60/274

\* cited by examiner

MULTI-LEG AFTERTREATMENT SYSTEM

CROSS-REFERENCE TO RELATED APPLICATION

The present application is a continuation of U.S. patent application Ser. No. 14/058,688 filed Oct. 21, 2013 which claims the benefit of the filing date of Provisional Application No. 61/720,379 filed on Oct. 30, 2012, both of which are incorporated herein by reference in its entirety for all purposes.

BACKGROUND

The technical field generally relates to internal combustion engine systems which include an aftertreatment system. Modern internal combustion engines must meet stringent emission standards that include a maximum amount of soot and nitrogen oxides ($NO_x$) that may be emitted. Many engines now utilize aftertreatment systems to reduce engine-out emissions to regulatory levels before release to the atmosphere. The process of regenerating the aftertreatment systems often introduces an increased emissions burden on the system; therefore aftertreatment systems have become more complex to reduce the total emissions of the engines. Therefore, a need remains for further improvements in systems, apparatus, and methods in this area.

SUMMARY

One embodiment is a unique multi-leg aftertreatment system. Other embodiments include unique methods, systems, and apparatus to determine a flow imbalance value of a multi-leg aftertreatment system. Further embodiments, forms, objects, features, advantages, aspects, and benefits shall become apparent from the following description and drawings.

DESCRIPTION OF THE ILLUSTRATIVE EMBODIMENTS

Figure 1:
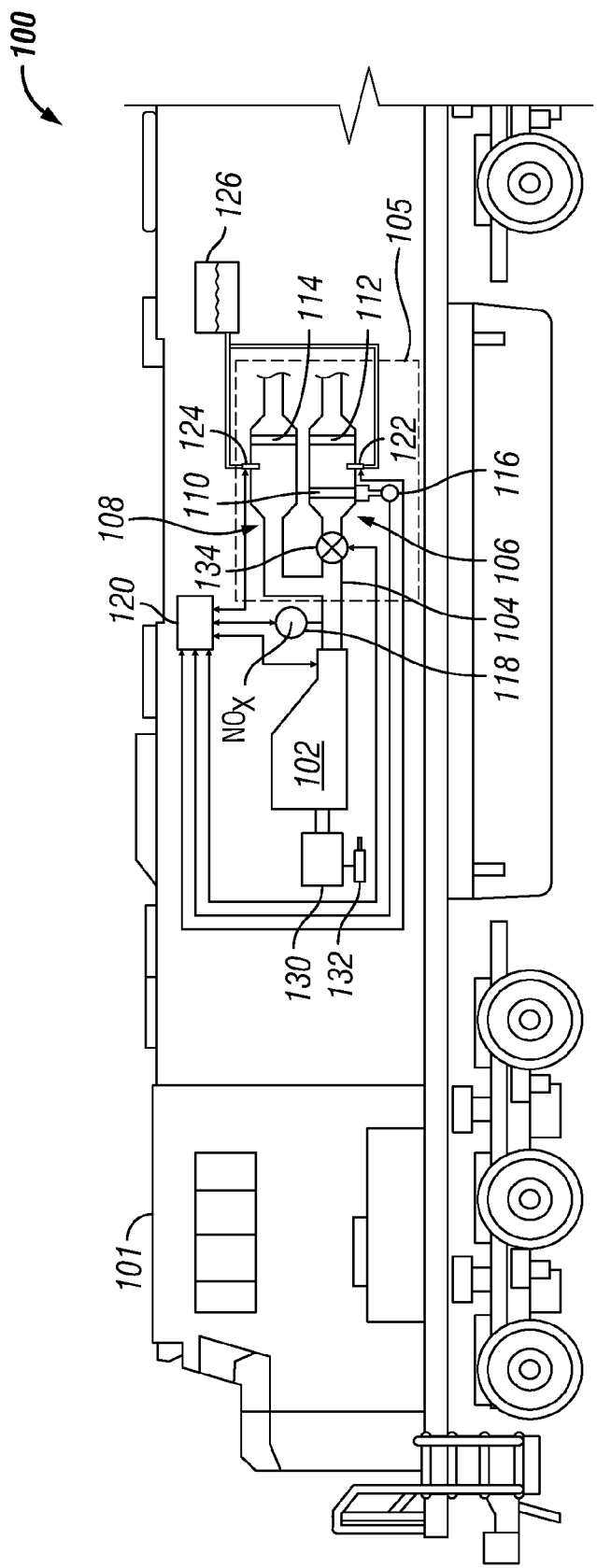
FIG. 1 is a schematic block diagram of a multi-leg aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 depicts an exemplary system 100 that includes an exhaust aftertreatment system 105. System 100 includes an engine 102 that may be utilized for any application, including at least providing power to a vehicle, providing power for stationary power generation, providing power for a pump (e.g. an oil rig pump), and/or to provide power to any other load. A generator 130 is powered by the diesel engine 102 and a motor 132 receives generated power from the generator 130. The motor 132 can be utilized to power a locomotive 101 as illustrated in FIG. 1. Engine 102 includes an intake system (not shown) through which charge air enters and an exhaust system 104 through which exhaust gas resulting from combustion exits. It should be appreciated that not all details of these systems that are typically present are shown.

Exhaust aftertreatment system 105 includes a diesel particulate filter (DPF) flowpath 106 and a DPF bypass flowpath 108. The DPF flowpath 106, or DPF leg 106, includes a DPF 110 and a first reductant catalyst 112. The DPF bypass flowpath 108, or bypass leg 108, bypasses the DPF flowpath 106 and includes a second reductant catalyst 114. The first reductant catalyst 112 and the second reductant catalyst 114 can be the same type of catalyst or the first reductant catalyst 112 and the second reductant catalyst 114 can be different types of catalysts depending on the specific application.

In certain embodiments, the first reductant catalyst 112 and the second reductant catalyst 114 may be selective catalytic reductant (SCR) catalysts or $deNO_x$ catalysts. However, the first reductant catalyst 112 and the second reductant catalyst 114 may be any catalysts which utilize a reductant (e.g. urea, ammonia, hydrocarbons, alcohols, or any other reductant) to reduce the emission of nitrogen oxides ($NO_x$) into the environment. One example of a suitable reductant is a diesel exhaust fluid (DEF) which comprises a solution of 32.5% high purity urea and 67.5% deionized water. It shall be appreciated, however, that any suitable reductant for injection into an exhaust system may also be utilized.

The DPF flowpath 106 and DPF bypass flowpath 108 may include one or more other aftertreatment components not shown, such as diesel oxidation catalysts, diesel particulate filters, an ammonia oxidation catalyst, and various temperature, pressure and exhaust gas constituent sensors. Exhaust system 104 may also include various components not shown, such an exhaust gas recirculation system, a turbocharger system, coolers, and other components connecting exhaust system 104 to the intake system.

The system 100 further includes a flow control valve 134 in fluid communication with the DPF flowpath 106. The flow control valve 134 controls the admission of exhaust gas through the DPF flowpath 106. Certain load levels can increase or decrease the likelihood of needing active management of soot loading. Higher loads, for example, result in exhaust gas temperatures and composition that are conducive to passive regeneration over the DPF 110, reducing the need for active management of soot loading. During light load operation, the flow control valve 134 may be configured to substantially block the exhaust flow to the DPF 110, since the need for active management of soot loading is increased.

In certain embodiments, the flow control valve 134 may be a simple on/off type valve in fluid communication with the DPF flowpath 106 that controls the flow of exhaust gas through the DPF flowpath 106 to the DPF 110 depending on valve position. In other embodiments, the flow control valve 134 may be a variable valve which allows continuous or discretely selectable amounts of exhaust to flow to the DPF 110. It is contemplated that in certain embodiments the system 100 includes a second flow control valve (not shown)

in fluid communication with the DPF bypass flowpath 108 that is structured to control the flow of exhaust gas through the DPF bypass flowpath 108.

The system 100 further includes a differential pressure sensor 116 fluidly coupled to the DPF flowpath 106 at a first position upstream of the DPF 110 and at a second position downstream of the DPF 110. The differential pressure sensor 116 may be a single pressure transducer, multiple pressure transducers, a single electromechanical pressure sensor, two inductive pressure sensors or any other combination of pressure sensor(s) that can be configured to determine a pressure drop across the DPF 110. This pressure drop may be conveyed from the differential pressure sensor 116 as a pressure value, multiple pressure values where a difference can be taken, a voltage which may be converted to a pressure value, and/or a digital signal which can be read by a processor or processor subsystem and is correlated to a pressure value.

In certain embodiments, a first doser 122 is operably coupled to the DPF flowpath 106 upstream of the first reductant catalyst 112 and a second doser 124 is operably coupled to the DPF bypass flowpath 108 upstream of the second reductant catalyst 114. The distance between the first doser 122 and the first reductant catalyst 112 and the distance between the second doser 124 and the second reductant catalyst 114 will vary depending on the type of catalyst and reductant utilized, for example with sufficient residence time provided for evaporation and/or decomposition of the reductant. As illustrated in FIG. 1, the first doser 122 and the second doser 124 are fluidly coupled to a reductant tank 126. In some embodiments, the reductant tank 126 may also be a fuel tank if the reductant is fuel; however, any reductant is contemplated herein. Furthermore, it is contemplated that the first doser 122 and the second doser 124 may be any type of reductant introduction device and/or injection device.

In an exemplary non-limiting embodiment, the first reductant catalyst 112 and the second reductant catalyst 114 are both SCR catalysts and urea is utilized as the reductant. In the exemplary embodiment a distance may be placed between first doser 122 and the first reductant catalyst 112 and the second doser 124 and the second reductant catalyst 114, such that the urea will evaporate and decompose into ammonia prior to reaching the catalysts.

In certain embodiments, the system 100 includes a $NO_x$ sensor 118 operably coupled to the exhaust system 104 upstream of the exhaust aftertreatment system 105. In other embodiments, a $NO_x$ sensor 118 may be coupled to each of the DPF flowpath 106 and the DPF bypass flowpath 108. In an exemplary embodiment, the $NO_x$ sensor 118 provides a $NO_x$ input value and is in communication with a controller 120.

Figure 3:
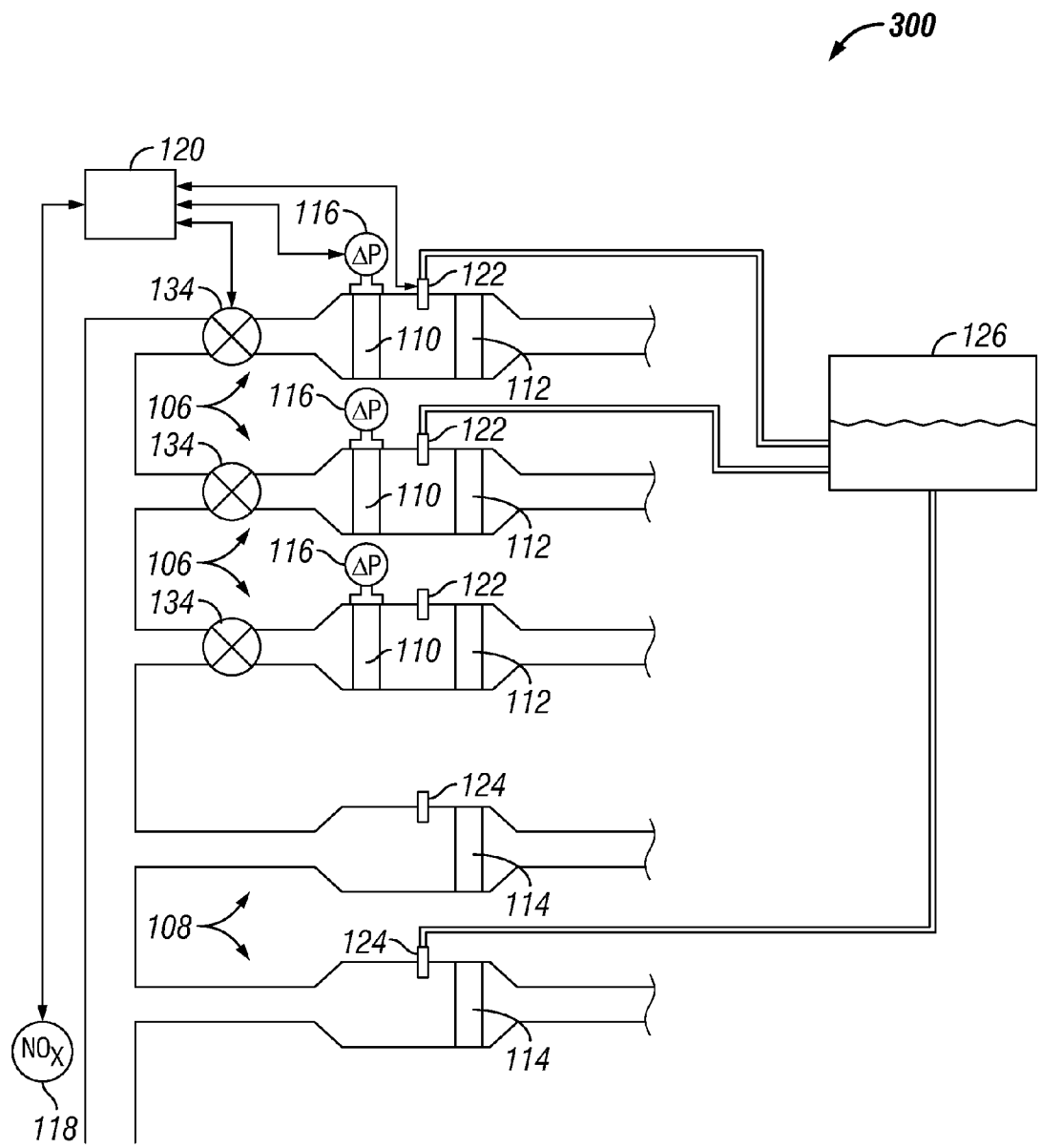
FIG. 3 is a cut away view of a schematic block diagram of a multi-leg aftertreatment system.

Referring now to FIG. 3, in certain embodiments, a system 300 includes a plurality of DPF flowpaths 106 and a plurality of DPF bypass flowpaths 108. FIG. 3 depicts three DPF flowpaths 106 and two DPF bypass flowpaths 108; however, any number of DPF flowpaths 106 and DPF bypass flowpaths 108 are contemplated herein, so long as there is at least one DPF flowpath 106 and one DPF bypass flowpath 108. While FIG. 3 depicts each DPF flowpath 106 and each DPF bypass flowpath 108 as having a first reductant catalyst 112 and a first doser 122 as well as a second reductant catalyst 114 and a second doser 124, any number of DPF flowpaths 106 may include a first reductant catalyst 112 and a first doser 122 and any number of DPF bypass flowpaths 108 may contain a second reductant catalyst 114 and a second doser 124, so long as at least one DPF flowpath 106 includes a first reductant catalyst 112 and a first doser 122 and at least one DPF bypass flowpath 108 includes a second reductant catalyst 114 and a second doser 124.

It is contemplated that each DPF 110 in a series of DPF flowpaths 106 may provide similar or different flow and filtration characteristics. It is also contemplated that each DPF flowpath 106 has an individual flow control valve 134, or that all DPF flowpaths 106 are controlled with a single flow control valve 134, and/or that any subset of DPF flowpaths 106 are controlled by individual flow control valves 134. Additionally or alternatively, DPF bypass flowpaths 108 lacking a DPF may similarly have a flow control valve (not shown). Furthermore, a singular $NO_x$ sensor 118 may be incorporated, each flowpath may contain a $NO_x$ sensor 118, or the amount of $NO_x$ may be modeled through the use of other engine parameters as is known to one of ordinary skill.

In certain embodiments, the system 100 or 300 further includes a controller 120 structured to perform certain operations to determine a flow imbalance value. In certain embodiments, the controller 120 forms a portion of a processing subsystem including one or more computing devices having memory, processing, and communication hardware. The controller 120 may be a single device or a distributed device, and the functions of the controller 120 may be performed by hardware or software. In certain embodiments, the controller 120 includes one or more modules structured to functionally execute the operations of the controller 120. In certain embodiments, the controller 120 includes an exhaust conditions module, a flow determination module, and a reductant determination module. The description herein including modules emphasizes the structural independence of the aspects of the controller 120, and illustrates one grouping of operations and responsibilities of the controller 120. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
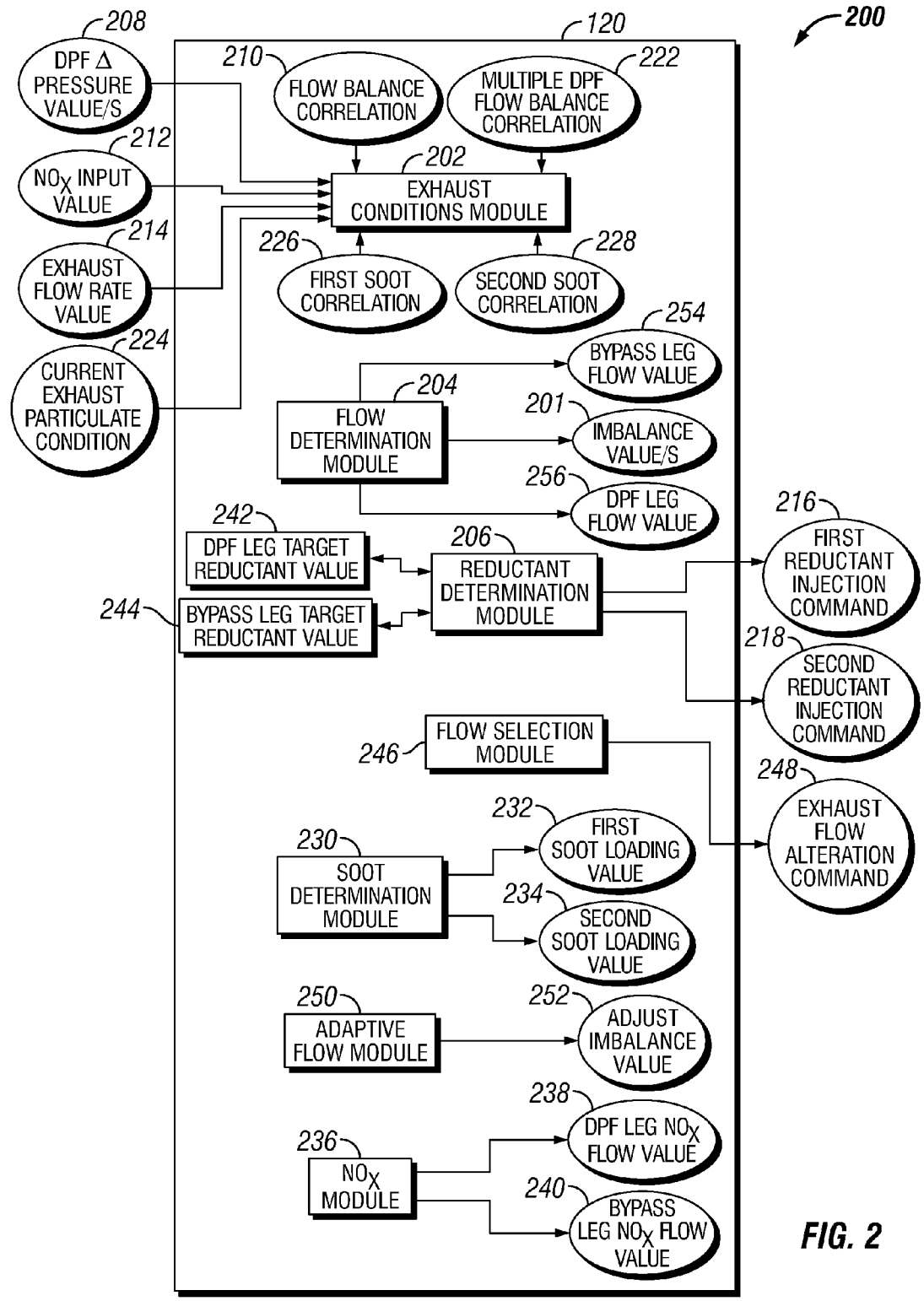
FIG. 2 is a schematic view of a controller that functionally executes certain operations to determine a flow imbalance value.

FIG. 2 is a schematic illustration of a processing subsystem 200 including a controller 120. An exemplary embodiment of the processing subsystem 200 includes an exhaust conditions module 202 that interprets one or more diesel particulate filter (DPF) delta pressure value(s) 208, a flow balance correlation 210, a $NO_x$ input value 212, and an exhaust flow rate value 214. The exemplary DPF delta pressure value 208 is an output from a differential pressure sensor 116 which shows a pressure drop across the DPF 110.

The flow balance correlation 210 may be a table, chart, and/or formula that has been calibrated to determine a flow imbalance value 201 in response to a given exhaust flow rate value 214 and a DPF delta pressure value 208. An exemplary processing subsystem 200 includes the flow balance correlation 210 being a set of tabulated DPF delta pressure values at predetermined exhaust flow rate values 214, providing flow imbalance values 201 which are calibrated and stored on the processing subsystem 200. The flow balance correlation 210 may be calibrated over any desired set of operating conditions, including without limitation operating conditions over which the diesel engine 102 is expected to operate, operating conditions over which the diesel engine 102 is regulated, a subset of any desired operating conditions wherein the flow balance correlation 210 is expected to reasonably extrapolate to the desired operating conditions, and/or operating conditions that are a superset of any desired operating conditions. The range and resolution of the values in the flow balance correlation 210 are selectable and define the resulting precision of the lookup table or other correlation.

The $NO_x$ input value 212 may be any output or model through which an amount of $NO_x$ in the bypass leg 108 and the DPF leg 106, utilizing the flow imbalance value 201, can be determined. In one embodiment, the $NO_x$ input value 212 is a $NO_x$ output from the $NO_x$ sensor 118 operably coupled to the exhaust system 104 upstream of the exhaust aftertreatment system 105. In further embodiments of the present invention, the $NO_x$ input value 212 is a frequency, a digital signal, or an analog signal from the $NO_x$ sensor 118. In yet further embodiments, the $NO_x$ input value is modeled from other engine parameters including, but not limited to, engine fueling, exhaust gas regeneration (EGR) fraction, engine speed, and/or engine temperature.

The exhaust flow rate value 214 may be any value which can be correlated to total exhaust flow through the DPF leg 106 and the bypass leg 108. In one embodiment of the present invention, the exhaust flow rate value 214 is modeled from one or more oxygen sensor inputs and the engine speed. In further embodiments, the exhaust flow rate value 214 may be determined using engine speed-density approach, from a flow meter, a flow correlation from a pressure drop across a venturi, and/or any other means to determine an exhaust flow rate as is known to one of skill.

A flow determination module 204 determines a flow imbalance value 201 in response to the DPF delta pressure value 208, the flow balance correlation 210, and the exhaust flow rate value 214. In an exemplary embodiment, the flow determination module 204 receives the DPF delta pressure value 208 and the exhaust flow rate value 214 and utilizes the flow balance correlation 210 to determine the flow imbalance value 201. The flow imbalance value 201 is any parameter that may be utilized to determine the flow rate of the DPF leg 106 and the bypass leg 108 for a given exhaust flow rate value 214. In certain embodiments of the present invention, the flow imbalance value 201 is only correlated to one leg (i.e. the DPF leg 106 or the bypass leg 108). In certain embodiments, the flow imbalance value 201 is a percentage value of the total exhaust flow which is flowing through the DPF leg 106. Alternatively or additionally, the flow imbalance value 201 includes the flow rate through the DPF leg 106 and/or the flow rate through the bypass leg 108.

Figure 4:
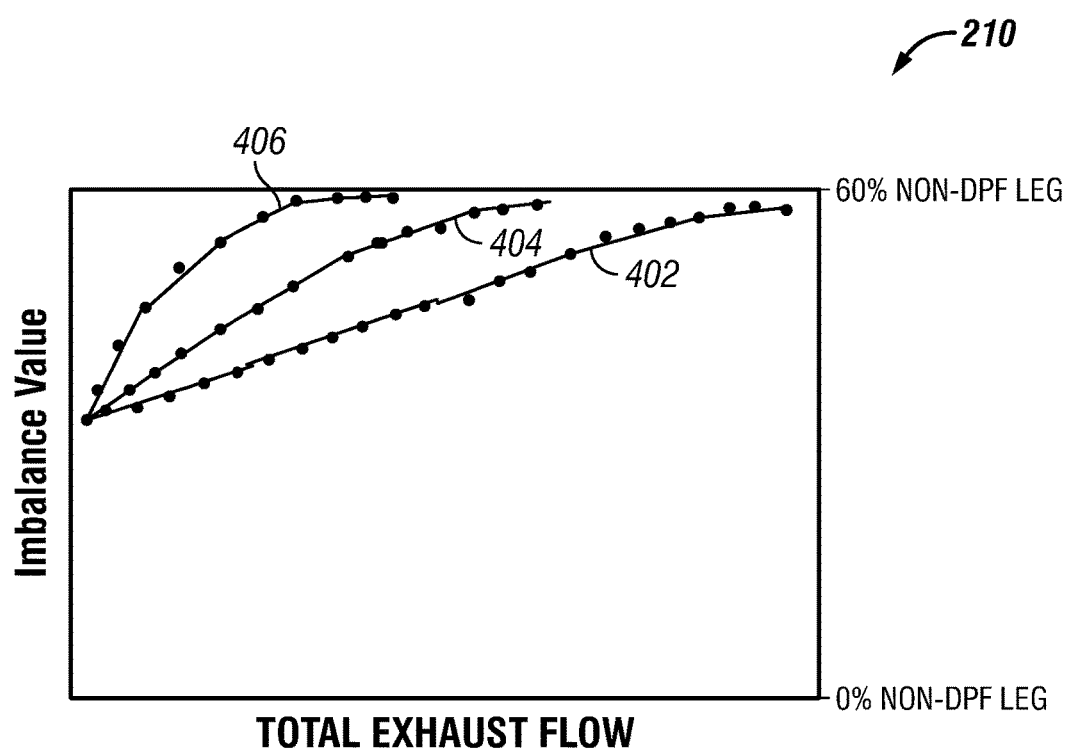
FIG. 4 is illustrative data correlating a flow imbalance value to a total exhaust flow and soot loading.

One embodiment of a flow balance correlation 210 is illustrated in FIG. 4. FIG. 4 is illustrative data for determining a flow imbalance value 201. In the example embodiment, soot loading is directly correlated to the DPF delta pressure value 208. For example, the curve 402 represents a clean or lightly loaded DPF, the curve 404 represents an intermediately loaded DPF, and the curve 406 represents a heavily loaded DPF 406. Data such as that illustrated in FIG. 4 is readily determined for a known system. The number of curves and data points on each curve are selectable according to the desired accuracy of the flow imbalance value.

As shown in FIG. 4, as the total exhaust flow between the two legs increases and as soot loading is increased, the flow imbalance value 201 increases (in this case the flow imbalance value 201 is the percentage of flow through the bypass leg 108). Data such as that shown in FIG. 4, and/or a digitized sampling or other representation thereof, may be viewed as one example of a flow balance correlation 210, with specific returned value from the data being imbalance values 201.

A reductant determination module 206 determines a first reductant injection command 216 and a second reductant injection command 218 in response to the flow imbalance value 201 and the $NO_x$ input value 212. In certain embodiments, the flow determination module 204 determines a DPF leg flow value 256 and a bypass leg flow value 254 in response to the flow imbalance value 201 and the exhaust flow rate value 214. Example DPF leg flow values 256 and bypass leg flow values 254 include the flow through each respective leg; however, it is additionally or alternatively contemplated that the DPF leg flow values 256 and the bypass leg flow values 254 may be any parameter representing or correlating to the flow through each respective leg.

In further embodiments, the reductant determination module 206 determines the first reductant injection command 216 and the second reductant injection command 218 in response to the DPF leg flow value 256, the bypass leg flow value 254, and the $NO_x$ input value 212. In yet further embodiments, the reductant determination module 206 provides the first reductant injection command 216 to a first doser 122 operably coupled to a DPF leg 106 and the second reductant injection command 218 to a second doser 124 operably coupled to a bypass leg 108.

In further embodiments, the exhaust conditions module 202 is further structured to interpret a current exhaust particulate condition 224. The current exhaust particulate condition 224 includes but is not limited to an output from a particulate sensor, a determination of a transient event which would result in particulate release from the diesel engine 102, a determination of the soot output from the diesel engine 102, and/or any other means for determining the amount of particulate which would be captured in DPF 110. In certain embodiments, the current exhaust particulate condition 224 is interpreted in response to an engine speed, an engine load, an engine fueling, an exhaust gas regeneration (EGR) fraction, and a particulate sensor value.

In certain embodiments, the apparatus includes a flow selection module 246 that can determine an exhaust flow alteration command 248 to alter an exhaust flow to the DPF leg 106 in response to the current exhaust particulate condition 224. An exemplary system including a generator 130 powered by the diesel engine 102 where the diesel engine 102 produces large amounts of exhaust particulate at startup further includes a flow selection module 246 that opens the DPF leg 106 during startup and closes the DPF leg 106 after the exhaust particulate has dropped below a predetermined level.

In certain embodiments, a $NO_x$ module 236 determines a DPF leg $NO_x$ flow value 238 and a bypass leg $NO_x$ flow value 240 in response to the flow imbalance value 201, the exhaust flow rate value 214, and the $NO_x$ input value 212. In further embodiments, the reductant determination module 206 further determines the first reductant injection command 216 in response to a DPF leg target reductant value 242, and determines the second reductant injection command 218 further in response to a bypass leg target reductant value 244. In certain embodiments, the reductant determination module 206 determines the DPF leg target reductant value 242 in response to the DPF leg $NO_x$ flow value 238. In further embodiments, the reductant determination module 206 determines the DPF leg target reductant value 242 in any manner to yield an amount of reductant that will reduce $NO_x$ to a desired level when used in combination with the first reductant catalyst 112.

In certain embodiments, reductant determination module 206 determines the bypass leg target reductant value 244 in response to the bypass leg $NO_x$ flow value 240. In certain embodiments, the reductant determination module 206 determines the bypass leg target reductant value 244 as a value which yields an amount of reductant sufficient to reduce $NO_x$ to the desired level when used in combination with the second reductant catalyst 114. In yet further embodiments, the reductant determination module 206 provides the first reductant injection command 216 to a first doser 122 operationally coupled to a DPF leg 106 and the second reductant injection command 218 to a second doser 124 operationally coupled to a bypass leg 108.

In certain embodiments, the processing subsystem 200 includes the controller 120 having an exhaust conditions module 202 that interprets a first soot correlation 226 and a second soot correlation 228, and the flow determination module 204 determines a DPF leg flow value 256 in response to the flow imbalance value 201 and the exhaust flow rate value 214. In certain embodiments, the first soot correlation 226 can be a table, chart, function, and/or other means that correlates a first soot loading value 232 to a DPF delta pressure value 208 and a exhaust flow rate value 214. In one embodiment, the second soot correlation 228 can be a table, chart, function, and/or other means to correlate a second soot loading value 234 to a DPF leg flow value 256 and a DPF delta pressure value 208. An example exhaust conditions module 202 utilizes a DPF delta pressure value 208 based model to provide the first soot correlation 226, and a soot accumulation/regeneration model (e.g. based on temperatures, soot loading, exhaust gas composition, etc.).

An example processing subsystem 200 further includes the controller 120 having a soot determination module 230 that determines a first soot loading value 232 in response to the DPF delta pressure value 208, the first soot correlation 226, and the exhaust flow rate value 214. An example soot determination module 230 further determines a second soot loading value 234 in response to the DPF leg flow value 256, the second soot correlation 228, and the DPF delta pressure value 208 (e.g. corresponding to a second leg having a second DPF). The first soot loading value 232 and the second soot loading value 234 can be the amount, or a representation or correlation of an amount, of soot and/or other particulate matter which has accumulated on the DPF 110.

In further embodiments, an adaptive flow module 250 adjusts the flow imbalance value 252 in response to the first soot loading value 232 and the second soot loading value 234. In certain embodiments, adjusting the flow imbalance value 252 further includes minimizing a difference between the first soot loading value 232 and the second soot loading value 234. The difference between the first soot loading value 232 and the second soot loading value 234 can be an arithmetic difference, a percentage difference, and/or any other means through which a difference between the first soot loading value 232 and the second soot loading value 234 can be determined. An exemplary adaptive flow module 250 minimizes or responds in feedback control to the difference between the soot loading values, causing the soot loading values to converge or progress toward convergence. In one example, the adaptive flow module 250 performs a particulate filter regeneration event in one of the DPF flow legs to reduce the soot loading in the regenerated leg toward the value of the soot loading in the other DPF flow leg.

In certain embodiments, the system 300 includes a plurality of DPF legs 106 and/or a plurality of bypass legs 108. One embodiment of this is illustrated in FIG. 3. In one embodiment, the exhaust conditions module 202 interprets a plurality of DPF delta pressure values 208, each DPF delta pressure value 208 corresponding to one of the DPF legs 106, and a multiple DPF flow balance correlation 222. In certain embodiments, the multiple DPF flow balance correlation 222 is a table, chart, or function which was determined through testing and/or modeling that correlates a DPF delta pressure value 208 of an individual DPF leg 106 to a flow imbalance value 201 for the particular leg given a particular exhaust flow rate value 214. Alternatively or additionally, the DPF delta pressure values 208 from all of the DPF legs 106 are added together and averaged. The imbalance parameter may be determined as an aggregate for all or a subset of the DPF legs 106, which may be correlated to the flow through all of the aggregated DPF legs 106.

An exemplary flow determination module 204 determines a flow imbalance value 201 corresponding to each of the DPF legs 106 in response to the corresponding DPF delta pressure value 208, the exhaust flow rate value 214, and the multiple DPF flow balance correlation 222. In further embodiments, the reductant determination module 206 determines a reductant injection command for each of the DPF legs 106 in response to the corresponding flow imbalance value 201 and the $NO_x$ input value 212.

Figure 5:
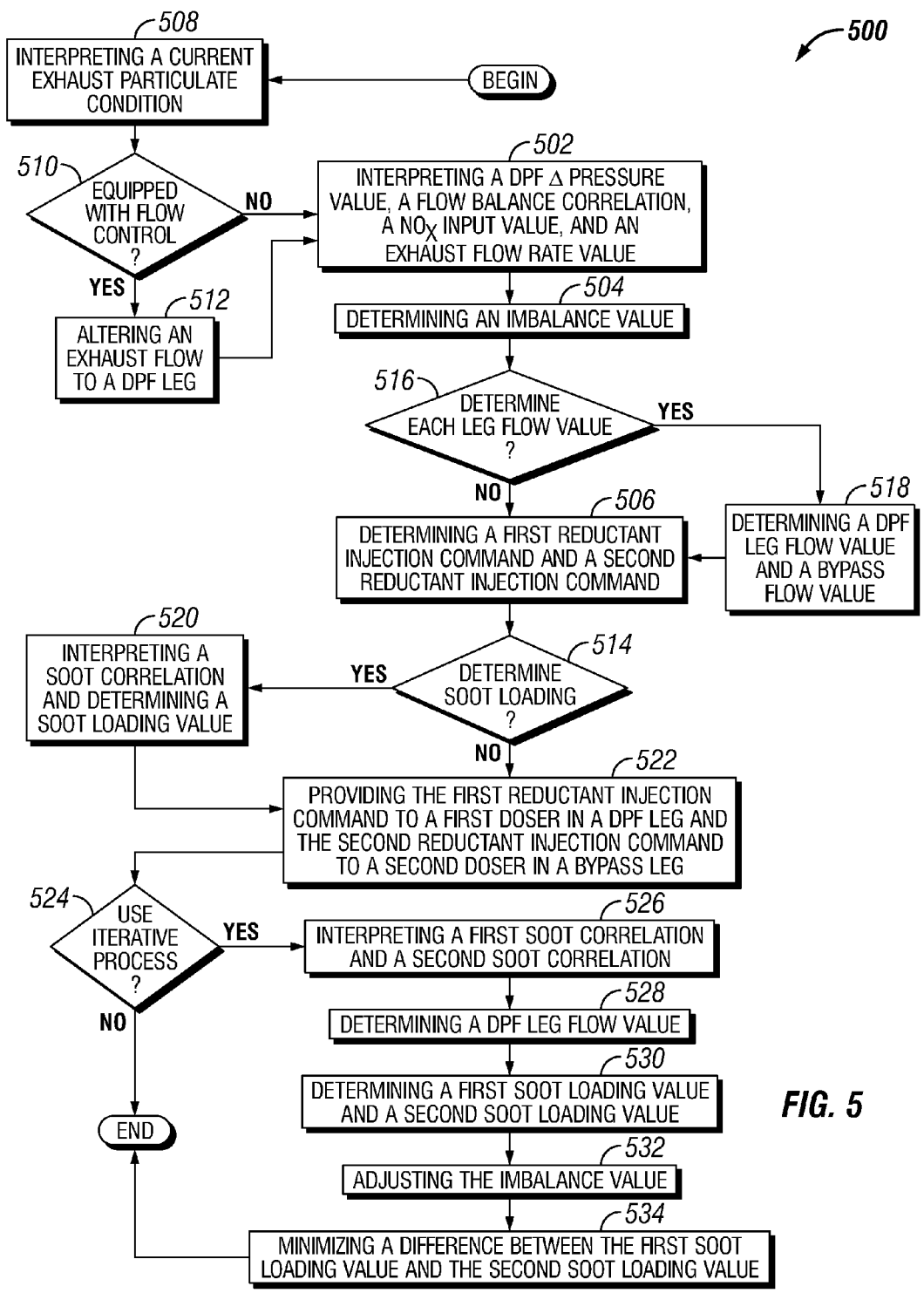
FIG. 5 is a schematic flow diagram of a procedure for determining a flow imbalance value and a soot loading value.

The schematic flow diagram in FIG. 5 and related description which follows provides an illustrative embodiment of performing procedures for determining a flow imbalance value. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

With reference to FIG. 5, there is illustrated a flow diagram of an exemplary procedure 500 for determining a flow imbalance value. The procedure 500 begins at operation 508 in which a current exhaust particulate condition is interpreted. Procedure 500 continues to conditional 510 where it is determined whether the system is equipped with flow control. In response to conditional 510 having a YES output, procedure 500 proceeds to operation 512, where an exhaust flow is altered to a DPF leg. In response to conditional 510 having a NO output, procedure 500 proceeds to operation 502, in which a DPF delta pressure value, a flow balance correlation, a $NO_x$ input value, and an exhaust flow rate value are each interpreted. Procedure 500 proceeds to operation 504 to determine a flow imbalance value.

From operation 504, procedure 500 proceeds to conditional 516 where it is determined whether to determine each leg flow value. In response to conditional 516 having a YES output, procedure 500 proceeds to operation 518 to determine a DPF leg flow value and a bypass flow value, then to operation 506 to determine a first reductant injection command and a second reductant injection command. In response to conditional 516 having a NO output, procedure 500 proceeds to operation 506.

Procedure 500 proceeds from operation 506 to conditional 514 to determine whether to determine soot loading. In response to conditional 514 having a YES output, procedure 500 proceeds to operation 520 to interpret a soot correlation and determines a soot loading value, then to operation 522 to provide the first reductant injection command to a first doser in a DPF leg and the second reductant injection command to a second doser in a bypass leg. In response to the determination operation 514 having a NO output, procedure 500 proceeds to operation 522. From operation 522, procedure 500 proceeds to conditional 524 to determine whether to use an iterative process. In response to conditional 524 having a NO output, the procedure may end. In response to conditional 524 having a YES output, procedure 500 proceeds to operation 526 to interpret a first soot correlation and a second soot correlation.

Procedure 500 proceeds to operation 528 to determine a DPF leg flow value. Procedure 500 proceeds then proceeds to operation 530 to determine a first soot loading value and a second soot loading value. Procedure 500 proceeds to operation 532 to adjust the flow imbalance value. Procedure 500 proceeds to operation 534 to minimize a difference between the first soot loading value and the second soot loading value.

As is evident from the Figures and text presented above, a variety of embodiments according to the present invention are contemplated. An exemplary set of embodiments includes an apparatus that includes a controller structured to receive operating parameters from at least one sensor associated with an engine exhaust system. The controller includes an exhaust conditions module that interprets the DPF delta pressure value, a flow balance correlation, the $NO_x$ input value, and an exhaust flow rate value. The apparatus further includes a flow determination module that determines a flow imbalance value in response to the DPF delta pressure value, the flow balance correlation, and the exhaust flow rate value. The apparatus further includes a reductant determination module that determines a first reductant injection command and a second reductant injection command in response to the flow imbalance value and the $NO_x$ input value.

In certain embodiments, the flow determination module determines a DPF leg flow value and a bypass leg flow value in response to the flow imbalance value and the exhaust flow rate value. In further embodiments, the reductant determination module determines the first reductant injection command and the second reductant injection command in response to the DPF leg flow value, the bypass leg flow value, and the $NO_x$ input value, and provides the first reductant injection command to a first doser in a DPF leg and the second reductant injection command to a second doser in a bypass leg.

In certain embodiments, the reductant determination module provides the first reductant injection command to a first doser in a DPF leg and the second reductant injection command to a second doser in a bypass leg. In further embodiments, the exhaust conditions module is further structured to interpret a current exhaust particulate condition, the apparatus further comprising a flow selection module structured to alter an exhaust flow to the DPF leg in response to the current exhaust particulate condition.

In certain embodiments, the current exhaust particulate condition is interpreted in response to a current exhaust particulate condition selected from the group of exhaust particulate conditions consisting of an engine speed, an engine load, an engine fueling, an exhaust gas regeneration (EGR) fraction, and a particulate sensor value. In certain embodiments, a $NO_x$ module determines a DPF leg $NO_x$ flow value and a bypass leg $NO_x$ flow value in response to the flow imbalance value, the exhaust flow rate value, and the $NO_x$ input value. In further embodiments, determining the first reductant injection command further includes determining the command in response to a DPF leg target reductant value and wherein the second reductant injection command further includes determining the command in response to a bypass leg target reductant value. In further embodiments, the DPF leg target reductant value is determined in response to the DPF leg $NO_x$ flow value and the bypass leg target reductant value is determined in response to the bypass leg $NO_x$ flow value. In yet further embodiments, the reductant determination module provides the first reductant injection command to a first doser in a DPF leg and the second reductant injection command to a second doser in a bypass leg.

In certain embodiments, the exhaust conditions module interprets a first soot correlation and a second soot correlation and wherein the flow determination module determines a DPF leg flow value in response to the flow imbalance value and the exhaust flow rate value. In further embodiments, a soot determination module determines a first soot loading value in response to the DPF delta pressure value, the first soot correlation, and the exhaust flow rate value. In further embodiments, the soot determination module determines a second soot loading value in response to the DPF leg flow value, the second soot correlation, and the DPF delta pressure value. In further embodiments, an adaptive flow module adjusts the flow imbalance value in response to the first soot loading value and the second soot loading value. In yet further embodiments, adjusting the flow imbalance value further includes minimizing a difference between the first soot loading value and the second soot loading value.

Another exemplary set of embodiments is a system including a diesel engine having an exhaust system including an exhaust aftertreatment system, wherein the exhaust aftertreatment system includes a diesel particulate filter (DPF) flowpath and a DPF bypass flowpath. The DPF flowpath includes a DPF and a first reductant catalyst. The DPF bypass flowpath bypasses the DPF and the DPF bypass flowpath includes a second reductant catalyst. The system further includes a differential pressure sensor fluidly coupled to the DPF flowpath at a first position upstream of the DPF and at a second position downstream of the DPF. The system further includes a controller. The controller includes an exhaust conditions module that interprets a DPF delta pressure value, a flow balance correlation, a $NO_x$ input value, and an exhaust flow rate value. The controller further includes a flow determination module that determines a flow imbalance value in response to the DPF delta pressure value, the flow balance correlation, and the exhaust flow rate value. The controller further includes a reductant determination module that determines a first reductant injection command and a second reductant injection command in response to the flow imbalance value and the $NO_x$ input value.

In certain embodiments, the exhaust conditions module interprets a soot correlation, the controller further comprising a soot determination module structured to determine a soot loading value in response to the DPF delta pressure value, the soot correlation, and the exhaust flow rate value. In certain embodiments, the exhaust conditions module interprets a current exhaust particulate condition and the controller further includes a flow selection module that commands a control valve fluidly coupled to the DPF flowpath to adjust an exhaust flow through the DPF flowpath in response to the current exhaust particulate condition.

In certain embodiments, a $NO_x$ sensor provides the $NO_x$ input value, wherein the $NO_x$ sensor operably coupled to the exhaust system upstream of the exhaust aftertreatment system. In certain embodiments, the system includes a plurality of DPF legs, wherein the exhaust conditions module interprets a plurality of DPF delta pressure values, each DPF delta pressure value corresponding to one of the DPF legs, and a multiple DPF flow balance correlation. In further embodiments, the flow determination module determines a flow imbalance value corresponding to each of the DPF legs in response to the corresponding DPF delta pressure value, the exhaust flow rate value, and the multiple DPF flow balance correlation. In further embodiments, the reductant determination module determines a reductant injection command for each of the DPF legs in response to the corresponding flow imbalance value and the $NO_x$ input value.

Another exemplary embodiment is a system that includes a diesel engine having an exhaust system with an exhaust aftertreatment system, wherein the exhaust aftertreatment system includes a diesel particulate filter (DPF) flowpath and a DPF bypass flowpath. The DPF flowpath includes a DPF and a first reductant catalyst. The DPF bypass flowpath bypasses the DPF and the DPF bypass flowpath includes a second reductant catalyst. The system further includes a differential pressure sensor fluidly coupled to the DPF flowpath at a first position upstream of the DPF and at a second position downstream of the DPF.

In certain embodiments, the system includes a generator operably coupled to the diesel engine and a motor electrically coupled to the generator structured to power a locomotive. In certain embodiments, at least one of the first reductant catalyst and the second reductant catalyst comprise a selective catalytic reduction (SCR) catalyst. In certain embodiments, the system includes a $NO_x$ sensor operably coupled to the exhaust system upstream of the exhaust aftertreatment system. In certain embodiments, the system includes a plurality of DPF flowpaths. In further embodiments, the system includes a plurality of DPF bypass flowpaths.

In certain embodiments, the system includes a controller. The controller includes an exhaust conditions that to interprets a diesel particulate filter (DPF) delta pressure value, a flow balance correlation, a $NO_x$ input value, and an exhaust flow rate value. The controller further includes a flow determination module that determines a flow imbalance value in response to the DPF delta pressure value, the flow balance correlation, and the exhaust flow rate value. The controller further includes a reductant determination module that determines a first reductant injection command and a second reductant injection command in response to the flow imbalance value and the $NO_x$ input value. The reductant determination module provides the first reductant injection command to a first doser upstream of the first reductant catalyst and the second reductant injection command to a second doser upstream of the second reductant catalyst.

Another exemplary embodiment is a method that includes interpreting a diesel particulate filter (DPF) delta pressure value, a flow balance correlation, a $NO_x$ input value, and an exhaust flow rate value. The method further includes determining a flow imbalance value in response to the DPF delta pressure value, the flow balance correlation, and the exhaust flow rate value. The method further includes determining a first reductant injection command and a second reductant injection command in response to the flow imbalance value and the $NO_x$ input value.

In certain embodiments, the method further includes interpreting a current exhaust particulate condition, and altering an exhaust flow to a DPF leg in response to the current exhaust particulate condition. In certain embodiments, the method further includes interpreting a soot correlation and determining a soot loading value in response to the DPF delta pressure value, the soot correlation, and the exhaust flow rate value.

In certain embodiments, the method further includes determining a DPF leg flow value and a bypass flow value in response to the flow imbalance value and the exhaust flow rate value. In further embodiments, the method further includes determining the first reductant injection command and the second reductant injection command in response to the DPF leg flow value, the bypass flow value, and the $NO_x$ input value. In yet further embodiments, the method further includes providing the first reductant injection command to a first doser in a DPF leg and the second reductant injection command to a second doser in a bypass leg.

In certain embodiments, the method includes interpreting a first soot correlation and a second soot correlation. In further embodiments, the method further includes determining a DPF leg flow value in response to the flow imbalance value and the exhaust flow rate value. In further embodiments, the method includes determining a first soot loading value in response to the DPF delta pressure value, the first soot correlation, and the exhaust flow rate value. In further embodiments, the method includes determining a second soot loading value in response to the DPF leg flow value, the second soot correlation, and the DPF delta pressure value. In further embodiments, the method includes adjusting the flow imbalance value in response to the first soot loading value and the second soot loading value. In yet further embodiments, the method includes minimizing a difference between the first soot loading value and the second soot loading value.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
a controller configured to receive operating parameters from at least one sensor associated with an engine exhaust system, the engine exhaust system including a diesel particulate filter (DPF) leg with a DPF and a first reductant catalyst and a bypass leg that bypasses the DPF, the bypass leg including a second reductant catalyst, wherein the controller is configured to:

receive and interpret a DPF delta pressure value, a flow balance correlation, a $NO_x$ input value, and an exhaust flow rate value associated with the engine exhaust system;

determine a flow imbalance value in response to the DPF delta pressure value, the flow balance correlation, and the exhaust flow rate value;

determine a first reductant injection command and a second reductant injection command in response to the flow imbalance value and the $NO_x$ input value; and provide the first reductant injection command for injection of reductant upstream of the first reductant catalyst and provide the second reductant command for injection of reductant upstream of the second reductant catalyst.

2. The apparatus of claim 1, wherein the controller is further configured to determine a DPF leg flow value and a bypass leg flow value in response to the flow imbalance value and the exhaust flow rate value;

wherein the controller is further configured to determine the first reductant injection command and the second reductant injection command in response to the DPF leg flow value, the bypass leg flow value, and the $NO_x$ input value.

3. The apparatus of claim 1, wherein the controller is further configured to interpret the current exhaust particulate condition, the controller further being configured to alter an exhaust flow to the DPF leg in response to the current exhaust particulate condition.

4. The apparatus of claim 3, wherein the current exhaust particulate condition is interpreted in response to a current exhaust particulate condition selected from the group of exhaust particulate conditions consisting of an engine speed, an engine load, an engine fueling, an exhaust gas regeneration (EGR) fraction, and a particulate sensor value.

5. The apparatus of claim 1, wherein the controller is further configured to:

determine a DPF leg $NO_x$ flow value and a bypass leg $NO_x$ flow value in response to the flow imbalance value, the exhaust flow rate value, and the $NO_x$ input value;

wherein determining the first reductant injection command further comprises determining the first reductant injection command in response to a DPF leg target reductant value and wherein the second reductant injection command further comprises determining the second reductant injection command in response to a bypass leg target reductant value;

wherein the DPF leg target reductant value is determined in response to the DPF leg $NO_x$ flow value and the bypass leg target reductant value is determined in response to the bypass leg $NO_x$ flow value.

6. The apparatus of claim 1, wherein the controller is further configured to interpret a first soot correlation and a second soot correlation, the controller further being configured to:

determine a DPF leg flow value in response to the flow imbalance value and the exhaust flow rate value;

determine a first soot loading value in response to the DPF delta pressure value, the first soot correlation, and the exhaust flow rate value;

determine a second soot loading value in response to the DPF leg flow value, the second soot correlation, and the DPF delta pressure value; and adjust the flow imbalance value in response to the first soot loading value and the second soot loading value.

7. The apparatus of claim 6, wherein adjusting the flow imbalance value further comprises minimizing a difference between the first soot loading value and the second soot loading value.

8. An apparatus, comprising:

a controller configured to receive operating parameters from at least one sensor associated with an engine exhaust system, the engine exhaust system including a diesel particulate filter (DPF) leg with a DPF, a first reductant catalyst, and a differential pressure sensor configured to provide a DPF delta pressure value, the engine exhaust system further including a bypass leg that bypasses the DPF, the bypass leg including a second reductant catalyst, wherein the controller is further configured to:

interpret the DPF delta pressure value, a flow balance correlation, a $NO_x$ input value, and an exhaust flow rate value;

determine a flow imbalance value in response to the DPF delta pressure value, the flow balance correlation, and the exhaust flow rate value; and determine a first reductant injection command and a second reductant injection command in response to the flow imbalance value and the $NO_x$ input value.

9. The apparatus of claim 8, wherein the controller is further configured to interpret a soot correlation and a soot loading value in response to the DPF delta pressure value, the soot correlation, and the exhaust flow rate value.

10. The apparatus of claim 8, wherein the controller is further structured to interpret a current exhaust particulate condition and command a control valve fluidly coupled to the DPF flowpath to adjust an exhaust flow through the DPF flowpath in response to the current exhaust particulate condition.

11. The apparatus of claim 8, further comprising a $NO_x$ sensor structured to provide the $NO_x$ input value, wherein the $NO_x$ sensor is operably coupled to the exhaust system upstream of the exhaust aftertreatment system.

12. The apparatus of claim 8, further comprising a plurality of DPF flowpath legs, wherein the controller is further configured to:

interpret a plurality of DPF delta pressure values, each DPF delta pressure value corresponding to one of the DPF legs, and a multiple DPF flow balance correlation;

determine a plurality of flow imbalance values, each one of the plurality of flow imbalance values corresponding to one of the DPF legs, in response to the corresponding DPF delta pressure value, the exhaust flow rate value, and the multiple DPF flow balance correlation; and determine a reductant injection command for each of the DPF legs in response to the corresponding flow imbalance value and the $NO_x$ input value.

* * * * *